May 12, 1959 M. O. HANSEN 2,885,957
SURFACE DECORATING APPARATUS
Filed Nov. 23, 1954 5 Sheets-Sheet 1

Inventor
MELVIN O. HANSEN

By Rule and Hoge.

Attorneys

May 12, 1959

M. O. HANSEN 2,885,957

SURFACE DECORATING APPARATUS

Filed Nov. 23, 1954

Inventor
MELVIN O. HANSEN

By Rule and Hoge.

Attorneys

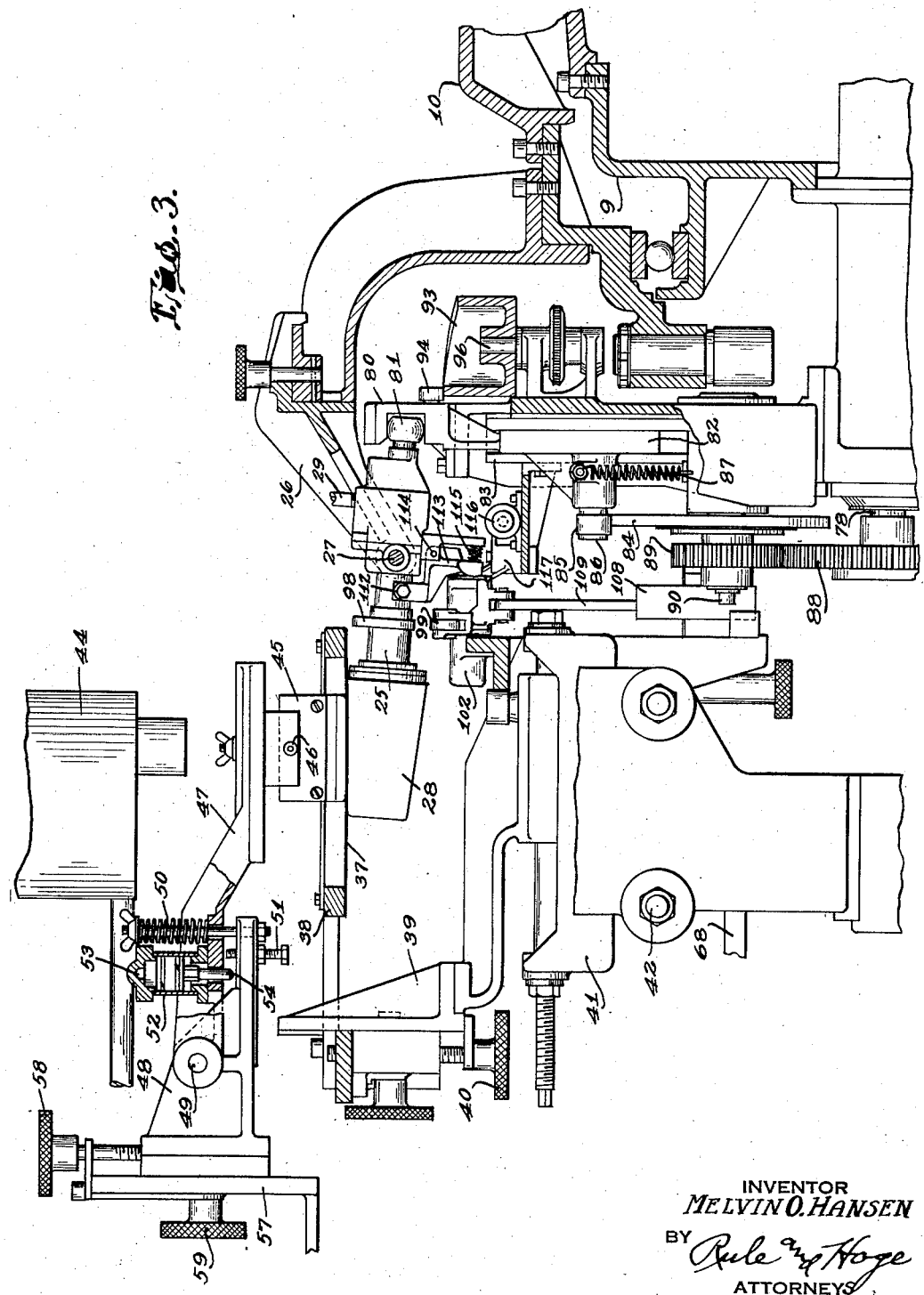

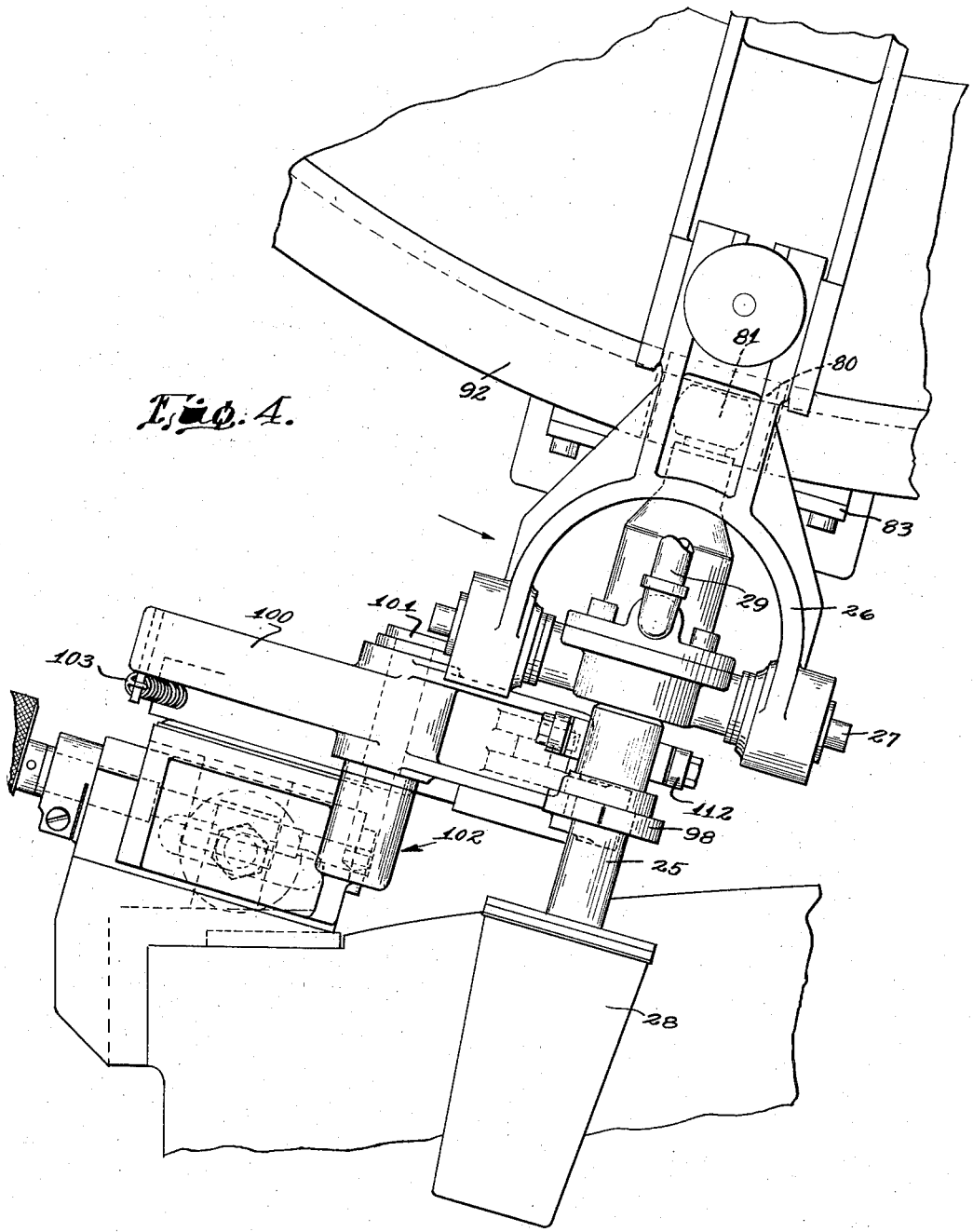

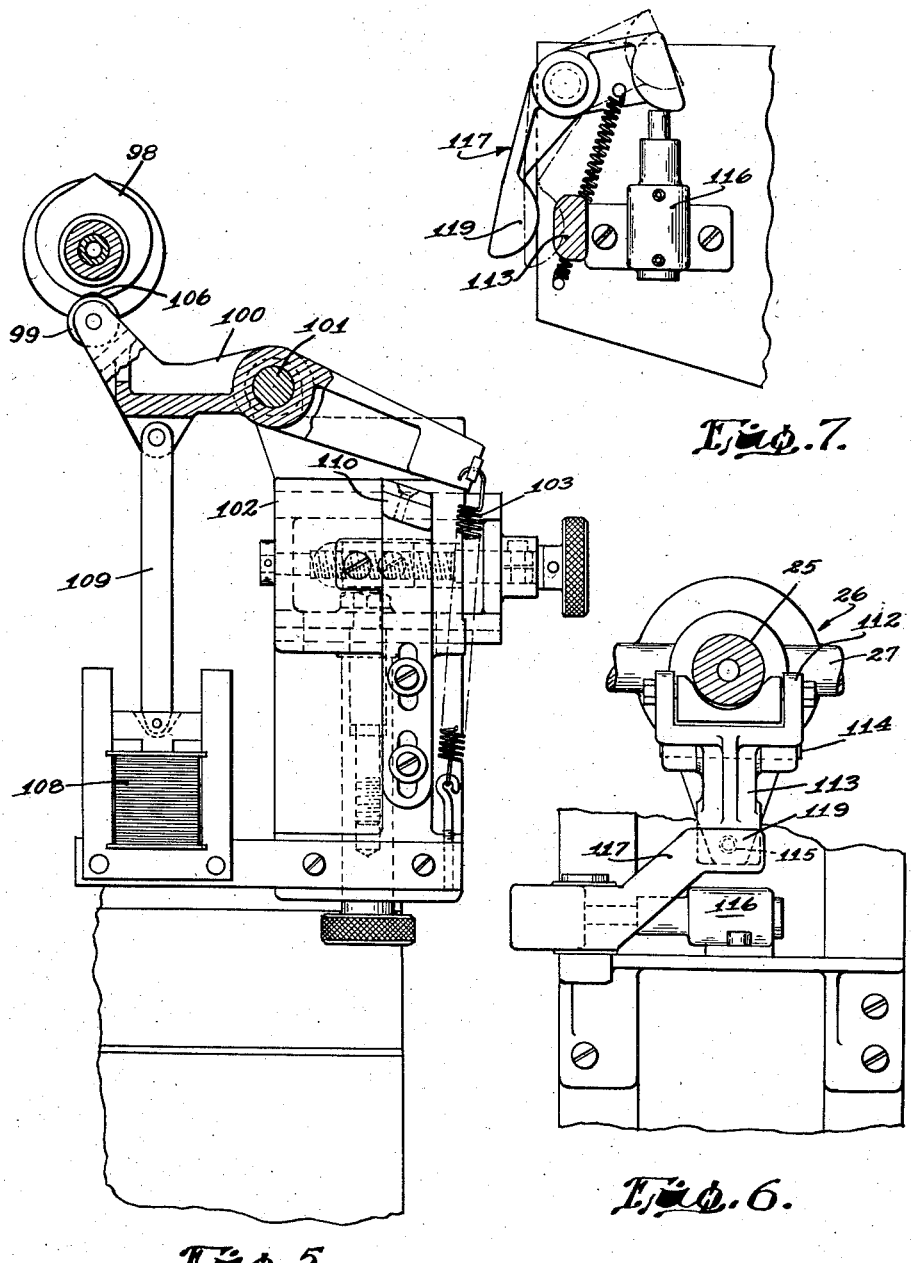

United States Patent Office 2,885,957
Patented May 12, 1959

2,885,957

SURFACE DECORATING APPARATUS

Melvin O. Hansen, Toledo, Ohio, assignor to Owens-Illinois Glass Company, a corporation of Ohio Application November 23, 1954, Serial No. 470,663

7 Claims. (Cl. 101—124)

This invention relates to apparatus for applying surface decorations, including lettering and other designs, to various articles such as tumblers, jars, and other articles. The decorations may be applied either in single or multiple colors by a silk screen process.

An object of the invention is to provide an apparatus which operates automatically to apply the surface decorations to the articles in rapid succession.

A further object is to provide novel means for accurately registering the articles for the successive applications of colors, one over another, when a plurality of colors are applied, without distortion of one color pattern by another.

A further object of the invention is to provide an apparatus for multiple color decorating in which each color when applied to the workpiece is quickly set or hardened, permitting the several colors of the design to be applied one over another in rapid succession.

Other objects of the invention will appear hereinafter.

The invention in its preferred form provides a turret or carriage on which are mounted a multiplicity of work-holding spindles arranged in an annular series with the spindles extending radially of the carriage. The carriage is rotated intermittently step by step, each step equal to the spacing of the spindles. Stationary silk screen decorating units positioned adjacent to and spaced circumferentially of the carriage, operate to apply the colors to the tumblers or other workpieces during the time intervals the turret is at rest between indexing operations. The workpieces are held by suction on the spindles, each workpiece being retained on a single spindle throughout the several color applications.

The invention is herein illustrated and described as adapted for applying multiple color decorations to glass tumblers, but is also adaptable for use in decorating other articles.

Referring to the accompanying drawings which illustrate a preferred form of the apparatus:

Fig. 3 is a sectional elevation of the screen decorating unit shown in Fig. 2, on a larger scale;

Fig. 4 is a plan view showing a workholding spindle and the yoke in which it is mounted;

Fig. 5 is a part sectional elevation of orienting means for rotatively adjusting the spindle to maintain registry of the several color applications;

Fig. 6 is a detail view of a brake device for a spindle; and

Fig. 7 is a detail view of a brake operating device.

Figure 1:
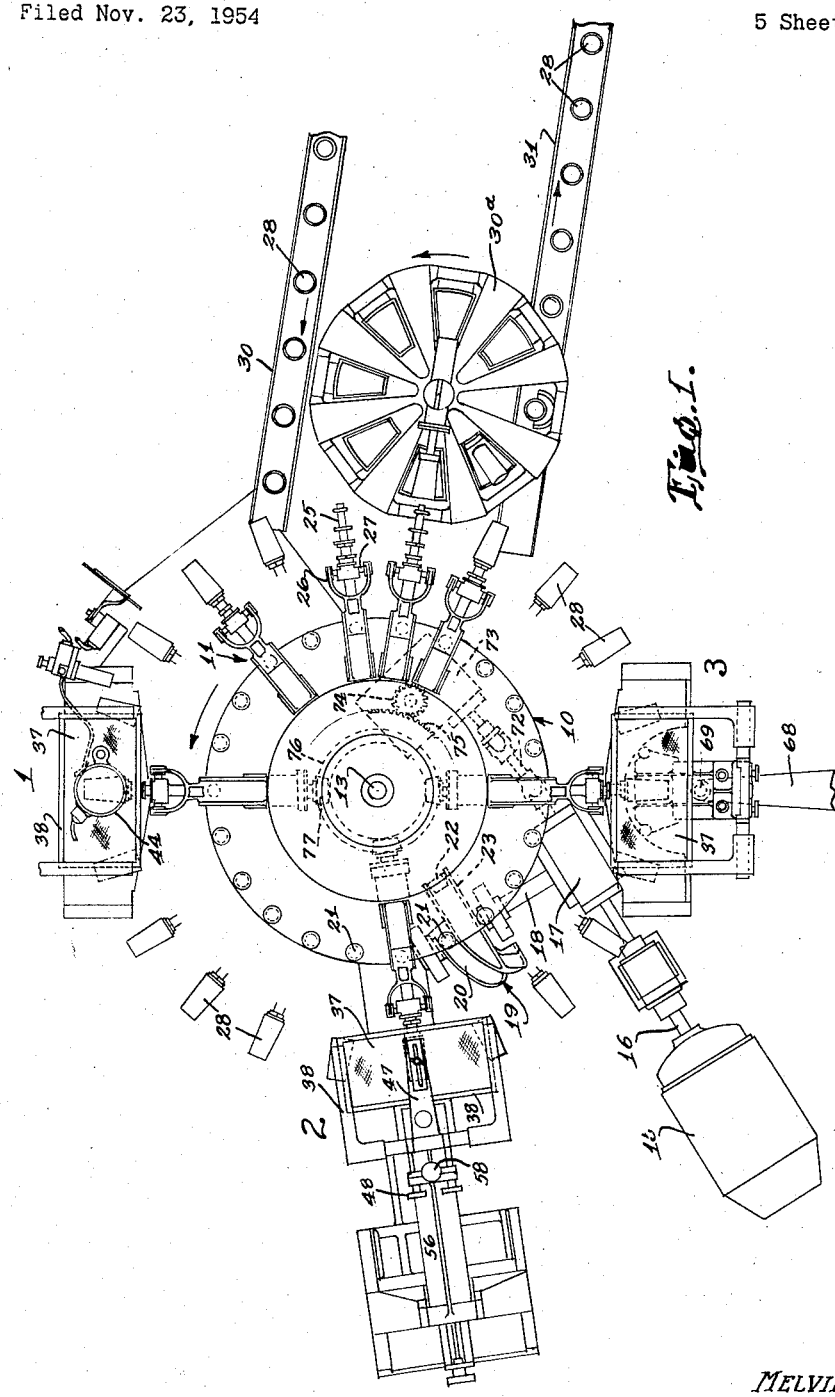
Fig. 1 is a partly diagrammatic plan view of the apparatus.

Referring to Fig. 1, the apparatus comprises a spindle carriage or turret 10 on which are mounted a multiplicity of spindle units 11 arranged in an annular series with the spindles equally spaced apart. The carriage is mounted on a frame 9 for intermittent step-by-step rotation about the axis of a vertical shaft 13. Each step rotation is through an angular distance equal to that between each two adjacent spindles. The carriage is rotated by a motor 15 having driving connection through a shaft 16 and gearing within a gear box 17 to a cam shaft 18. A cam 19 fixed to the shaft 18 is formed with a cam track or groove 20 in which run cam follower rolls 21 mounted on the carriage 10, the spacing of the rolls 21 circumferentially of the carriage being equal to the spacing of the spindles 11. The cam track 20 is shaped to advance the carriage through one step during each rotation of the cam and then holds the carriage at rest while the color decorations are being applied to the workpieces. The carriage is positively held against rotation during the decorating operations by a holding element or roll 22 engaging a dwell portion 23 of the cam.

Each spindle unit 11 or assembly includes a spindle 25 mounted in a yoke 26 for rocking movement about the axis of a horizontal pivot pin 27 perpendicular to the spindle. The workpieces, herein shown as tumblers 28, are held on the spindles by suction supplied, as hereinafter described, through pipes 29 individual to the spindles, the suction lines extending to and lengthwise through the spindle shafts to the free ends of the spindles.

The tumblers are brought to the decorating apparatus by an endless belt conveyor 30 and may be placed on the spindles either by hand or by automatic mechanism (not shown). Each tumbler is advanced step by step by the rotation of the carriage and thereby brought to the decorating stations 1, 2, and 3 in succession for receiving the successive color designs. The tumbler, after the decorating operation, is removed from the spindle either by hand or by an automatic device 30a (which forms no part of the present invention) and is placed on a belt conveyor 31.

The decorating units at stations 1, 2, and 3 may be all of substantially the same construction. Each decorating unit is mounted on machine base 35 (Fig. 2) for movement to and from operative relation to the spindle carriage 10 and is held in such position by means including a coupling pin 36. The decorating units are of the silk screen type and each comprises a silk screen 37 (Figs. 1, 2, 3) mounted in a screen frame 38. The frame 38 is supported in a bracket 39 and adjustable up and down therein by means of an adjusting thumb screw 40. The bracket 39 is mounted on a carriage 41 for horizontal adjustment toward and from the spindle carriage 10.

The carriage 41 is mounted for reciprocating movement on a pair of horizontal guide rods 42 for reciprocating the screen 37. The color design to be applied to the tumblers 28 is stenciled or formed in the screen 37. The ink or color material is supplied from a receiver 44 and drops on to the screen. A squeegee 45 is held in contact with the screen over the line of contact of the screen with the tumbler. The tumbler is held in rolling contact with the screen while the latter is moved horizontally thereby causing the squeegee to transfer the design to the tumbler in a manner well-known in the art. The squeegee 45 is connected by a pivot 46 to an arm 47 carried on a bracket 48 to which it is connected by a pivot 49 for up-and-down swinging movement. A coil compression spring 50, mounted on a rod in the bracket 48, applies downward pressure to the squeegee. An adjustable stop screw 51 limits the downward movement of the squeegee arm.

Automatic means is provided for lifting and holding the squeegee off the screen in the event that an empty spindle is brought to the decorating station. Such means comprises an air motor or cylinder 52. If the spindle is empty, air pressure is supplied through a port 53, thereby moving the motor piston downward. This causes the piston rod or stem 54 to engage the bracket 48 so that upward pressure is applied to the cylinder 52 and the squeegee arm to which it is attached. This holds the squeegee off the screen. The air pressure supply to cylinder 52 may be controlled by a solenoid operated valve, the solenoid in turn being controlled by a switch in the path of the workpiece.

The bracket 48 which carries the squeegee is mounted on a carrier 56 in the form of a casting having an upright arm 57 to which the bracket is attached. An adjusting screw with a knob 58 provides a means for adjusting the bracket and squeegee up and down. A clamping screw 59 holds the parts in adjusted position. The carrier 56 is connected by a pivot 60 to an upright frame member 61. The weight of the member 56 and parts carried thereby is supported by a coil spring 62 mounted on a stationary support 63.

The screen carriage 41 is reciprocated on the guide rods 42 by means of a cam 65 continuously driven by the motor 15 as presently described. The cam operates through a cam follower roll 66 and connecting means 67 to rock a horizontal arm 68 about a pivot pin 69. The arm 68 has an operating connection 70 with the carriage 41 for reciprocating the latter.

Figure 2:
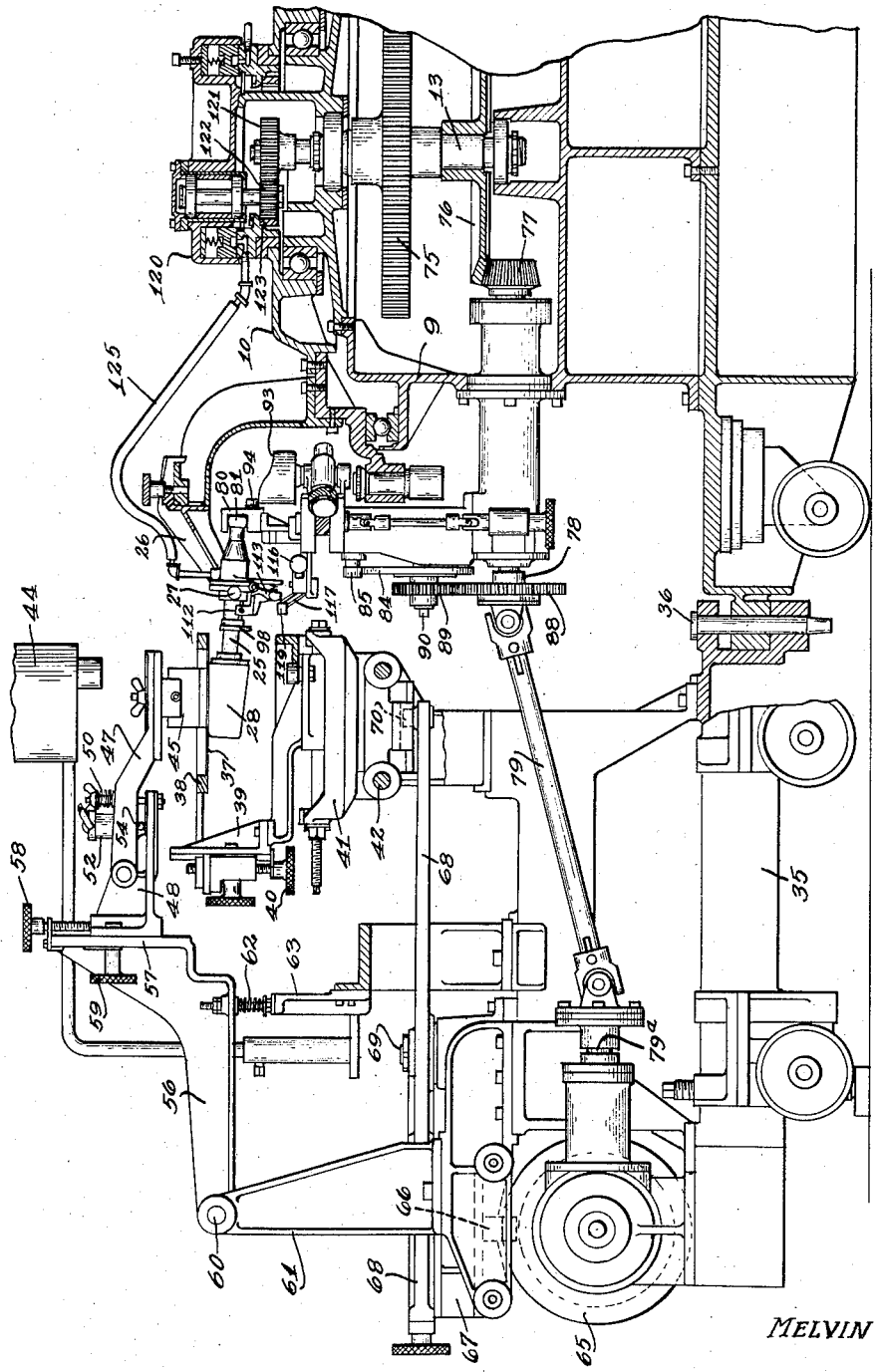
Fig. 2 is a part sectional elevational view showing one of the screen decorating units, the spindle turret and associated mechanism, parts being broken away.

The motor 15 (Fig. 1) has driving connection with the cam 65 through a train of gearing including a shaft 72 extending from the gear box 17 and connected through gearing in a gear box 73 to a pinion 74 which drives a gear 75 on the shaft 13 (Figs. 1 and 2). A bevel gear 76 on the shaft 13 drives a pinion 77 on a shaft 78 connected by a universal joint to a shaft 79. The shaft 79 is connected to a shaft 79a having driving connection with the cam shaft on which the cam 65 is keyed. The cam 65 is designed and shaped to drive the screen carriage 41 and screen in one direction while the spindle carriage is at rest with a workpiece 28 held in contact with the screen, and to drive the screen carriage in the reverse direction while the next succeeding workpiece is at the decorating station.

It will be noted that the shaft 13 and gears 75, 76 thereon are rotated continuously about the axis of the intermittently rotated spindle carriage 10. This permits the screen to be operated while the spindle carriage 10 is at rest.

Each spindle 25 when brought to a decorating station is tilted about its pivot 27 to lift the workpiece into contact with the screen 37. For this purpose a cam yoke 80 is positioned to receive a cam roll 81 on the inner end of the spindle shaft as the spindle is brought into position beneath the screen 37. The yoke 80 is attached to a vertical slide bar 82 movable up and down in guideways 83. The yoke 80 is moved upward by a cam 84 on which runs a cam roll 85 on a stud shaft 86 on the slide bar 82. The roll 85 is held to the cam by a coil tension spring 87 which operates to move the yoke 80 downwardly and apply a yielding upward pressure of the workpiece 28 against the screen 37 while the workpiece is rotated during the horizontal travel of the screen. The cam 84 is geared for continuous rotation by the shaft 78 operating through spur gears 88 and 89 keyed respectively to the shaft 78 and cam shaft 90 on which the cam 84 is mounted.

A stationary track 92 (Fig. 4) in which the roll 81 runs during the travel of the spindle between decorating stations, prevents tilting of the spindle except at the decorating stations. The track 92 may be continuous throughout the circumference of the spindle carriage 10 except at the decorating stations where the cam yokes 80 are located, these yokes being in effect movable sections of the track.

The upward swinging movement of the workpiece 28 with the spindle is limited by a cam shaped stop 93 engaged by a roll 94 on the yoke 80. The stop 93 is rotatively adjustable about a vertical axis by means of an adjusting wheel 95 on the spindle 96 to which the cam stop 93 is attached. This adjusts the height of the yoke. The stop serves to hold the spindle out of contact with the screen when a workpiece is missing.

Means for rotatively adjusting the spindle 25 for orienting the tumbler 28 and registering it with the screen patterns is as follows:

A cam 98 having a fixed mounting on the spindle is engaged by a cam follower roll 99 (Fig. 5) on a rocker 100. The latter is mounted to swing about a pivot pin 101 in a supporting member 102. A coil spring 103 under tension causes the roll 99 to bear against the cam. The perimeter of the cam is approximately heart-shaped with spiral cam surfaces tapered or convergent with respect to the circular perimeter of the spindle. The shape is such that the pressure of the roll 99 will rotate the spindle from any position in a direction to bring the roll 99 to the lowest point on the cam, as shown in Fig. 5. In this position the follower roll seats in a recess 106 in the cam surface. One of these orientating devices is located at each decorating station and is positioned to orient the workpiece before the latter is swung upwardly by the spindle into engagement with the decorating screen. In this manner the workpiece is brought into rotative position at each station for causing the color patterns from all of the screens to be brought into accurate registration. The cam follower roll 99 is withdrawn from the spindle after the latter has been rotated thereby, by any suitable means. As herein shown, an electromagnet 108 connected through a link 109 to the rocker 100, operates periodically to withdraw the roll 99. A stop bar 110 adjustable up and down on the frame 102 limits the upward movement of the roll 99.

The spindles 25 are held against free rotation, except while at the decorating stations, by a brake mechanism comprising a brake 112 (Figs. 2, 3 and 6). The brake is carried on an arm 113 which swings on a pivot 114. The brake is held lightly against the spindle by a coil compression spring 115. Means for releasing the brake comprises a piston motor 116 (Fig. 7) which operates to swing a rocker 117 about a vertical axis. The rocker is formed with a head 119 which projects behind the arm 113 and swings it about the pivot 114 for releasing the brake. This permits the spindle to rotate freely about its axis for orienting the workpiece as above described. Immediately thereafter the workpiece is swung upwardly against the screen for the decorating operation.

A vacuum distributing head 120 (Fig. 2) is mounted on the spindle carriage 10 for continuous rotation about the axis of the shaft 13. The head 120 is rotated by a train of gearing including a spur gear 121 on the shaft 13 which drives a pinion 122 running in mesh with an internally toothed ring gear 123 connected to the distributing head. The latter is thus rotated in the same direction as the spindle carriage and at the same average speed. That is, the head 120 makes a complete rotation during the time interval required for a complete rotation of the spindle drum. Suction lines 125 individual to the spindles extend from the head 120 to the spindles. Suction is continuously applied to the head 120 and through the lines 125 to the spindles.

Modifications may be resorted to within the spirit and scope of my invention.

I claim:

1. Apparatus for printing designs on tumblers or other articles having round surfaces, said apparatus comprising a spindle carriage, article holding spindles mounted in an annular series on the carriage and projecting radially outward therefrom, means for intermittently rotating the carriage and thereby bringing the spindles in succession to a decorating station, a horizontally disposed decorating screen mounted at said station for horizontal movement in a plane over the path of the spindles and articles thereon, the spindles being mounted for up-and-down swinging movement on said carriage, means at said station for swinging the spindles and thereby moving the articles carried thereby upwardly into contact with the screen and holding the articles in rolling contact with the screen during said horizontal movement of the screen, a squeegee mounted over the screen and bearing against the screen at the line of contact of said articles with the screen, the means for swinging the spindles comprising a yoke mounted for up-and-down movement at said station, rolls carried by the spindles and brought in succession into engagement with the said yoke by the rotation of the spindle carriage, the yoke being formed to provide positive operating connections with the spindles for positively swinging the spindles during both up-and-down movements of the said yoke, means operating through said yoke to hold the workpiece with a yielding pressure against the screen, and means for effecting said movements of the yoke while the spindles are in engagement therewith and while the spindle carriage is at rest.

2. The apparatus defined in claim 1, the means for moving said yoke comprising a cam, means for rotating the cam while the carriage is at rest, and means providing operating connection between the cam and said yoke.

3. The apparatus defined in claim 1, the means for moving the yoke comprising a cam, means for rotating the cam while the carriage is at rest, and a cam follower roll carried by said yoke, the said means for holding the workpiece with a yielding pressure against the screen comprising a spring by which the cam follower roll is held on the said cam.

4. Article decorating apparatus comprising a spindle carriage mounted for rotation about a vertical axis, an annular series of radially extending spindles mounted on the carriage for rotation therewith for bringing the spindles in succession to a decorating station, suction means for holding articles by suction on the spindles and thereby bringing the articles to the decorating station, means at said station for applying surface decoration to the articles, a vacuum distributing head mounted for rotation about the axis of the spindle carriage, vacuum lines individual to the spindles and extending from the distributing head to the spindles, means for rotating the spindle carriage intermittently step by step, the decorating means being operative to apply the decorations while the spindle carriage is at rest, and means for rotating the vacuum distributing head continuously.

5. Article decorating apparatus comprising a spindle carriage mounted for rotation about a vertical axis, an annular series of article holding spindles mounted on the carriage for rotation therewith, a plurality of decorating units positioned at decorating stations spaced at intervals circumferentially of the carriage, means for operating the decorating units and causing each unit to apply a design to the articles, said spindles being mounted for free rotation about their axes, and orienting means at said stations for rotating the spindles to a predetermined rotative position and holding them in said position and thereby causing registration of the designs applied to the articles at the several stations, said orienting means including cams mounted on the spindles, follower rollers in engagement with the cams, means for pressing the rollers against the cams in a direction to apply a turning force to the cams and thereby rotating the spindles to a predetermined rotative position, and means for holding the spindles in said rotative position.

6. The apparatus as defined in claim 5, the said cams having contact surfaces surrounding the spindles with which surfaces the follower rollers engage, the pressure of the rollers against the cams being in a direction radial to the axes of the spindles, the said surfaces of each cam being spirally divergent from a low point so that pressure of the follower roller against the spiral surface is in a direction at an acute angle to the surface at the point of contact, thereby applying a turning force to the cam by which the cam and its spindle are rotated in a direction to bring the follower roller to the said low point of the cam.

7. The apparatus defined in claim 6, each of the cams being formed at its low point with a recess to receive the follower roller and thereby hold the spindle against rotation.

References Cited in the file of this patent

UNITED STATES PATENTS

| | | |
|---|---|---|
| 2,153,435 | Schneider et al. | Apr. 4, 1939 |
| 2,198,565 | Schutz et al. | Apr. 23, 1940 |
| 2,231,535 | Jackson et al. | Feb. 11, 1941 |
| 2,484,671 | Bauman | Oct. 11, 1949 |